(12) United States Patent
Hull (10) Patent No.: US 9,688,058 B2
(45) Date of Patent: Jun. 27, 2017

(54) METHODS AND APPARATUS FOR SUPPORTING RADIO FREQUENCY IDENTIFICATION TAGS

(71) Applicant: R.R. Donnelley & Sons Company, Chicago, IL (US)

(72) Inventor: Brad Hull, Warrenville, IL (US)

(73) Assignee: R.R. Donnelley & Sons Company, Chicago, IL (US)

(*) Notice: Subject to any disclaimer, the term of this patent is extended or adjusted under 35 U.S.C. 154(b) by 0 days.

(21) Appl. No.: 15/001,851

(22) Filed: Jan. 20, 2016

(65) Prior Publication Data

US 2016/0224878 A1    Aug. 4, 2016

Related U.S. Application Data

(60) Provisional application No. 62/109,872, filed on Jan. 30, 2015.

(51) Int. Cl.
*G06K 5/00* (2006.01)
*B32B 37/00* (2006.01)
(Continued)

(52) U.S. Cl.
CPC ........ *B32B 37/0046* (2013.01); *B32B 37/223* (2013.01); *B32B 37/02* (2013.01);
(Continued)

(58) Field of Classification Search
CPC ....... H01L 2924/00; H01L 2924/00014; H01L 2224/45015; H01L 2224/45014; H01L 2224/78301; H01L 2924/10253; H01L 2224/45124; H01L 2224/45147; H01L 2224/85205; H01L 2924/01015; H01L 2224/85399; H01L 2924/0102; H01L 2924/01029; H01L 2924/01033; H01L 2924/01047; H01L 2924/01075; H01L 2924/01079; H01L 2924/01082; H01L 2924/20752; H01L 2224/16225; H01L 2224/16227; H01L 2224/4813; B32B 2037/1246; B32B 37/02; B32B 2307/20;
(Continued)

(56) References Cited

U.S. PATENT DOCUMENTS

5,206,626 A    4/1993  Minasy et al.
5,448,110 A    9/1995  Tuttle et al.
(Continued)

*Primary Examiner* — Thien M Le
(74) *Attorney, Agent, or Firm* — McCracken & Gillen LLC (57) ABSTRACT

Methods and apparatus for supporting radio frequency identification tags are disclosed herein. An example apparatus includes a face layer that includes a tag seat, a first extension extending from a first edge of the tag seat, and a second extension extending from a second edge of the tag seat, a third extension extending from a third edge of the tag seat, and a fourth extension extending from a fourth edge of the tag seat. The example apparatus includes an adhesive layer applied to at least a portion an inner surface of the face layer. The example apparatus includes an RFID tag coupled to the tag seat. The RFID tag is to be spaced apart from a surface when outer portions of the first extension and the second extension are coupled to the surface and inner portions of the first extension and the second extension are flexed away from the surface.

18 Claims, 7 Drawing Sheets

(51) Int. Cl.
  *B32B 37/22* (2006.01)
  *B32B 37/12* (2006.01)
  *B32B 37/02* (2006.01)
  *B32B 38/04* (2006.01)
  *B32B 38/10* (2006.01)
  *B32B 38/00* (2006.01)
  *B32B 41/00* (2006.01)

(52) U.S. Cl.
  CPC ........... *B32B 37/1284* (2013.01); *B32B 38/04* (2013.01); *B32B 38/10* (2013.01); *B32B 38/145* (2013.01); *B32B 2037/1246* (2013.01); *B32B 2041/04* (2013.01); *B32B 2307/20* (2013.01); *B32B 2367/00* (2013.01); *B32B 2519/02* (2013.01)

(58) Field of Classification Search
  CPC .............. B32B 37/0046; B32B 37/223; B32B 2519/02; B32B 37/1284; B32B 38/04; B32B 38/10; B32B 38/145
  USPC .................................................. 235/375, 380
  See application file for complete search history.

(56) References Cited

U.S. PATENT DOCUMENTS

| | | | |
|---|---|---|---|
| 5,497,140 A | 3/1996 | Tuttle | |
| 6,147,662 A | 11/2000 | Grabau et al. | |
| 6,281,795 B1 | 8/2001 | Smith et al. | |
| 6,451,154 B1 | 9/2002 | Grabau et al. | |
| 6,486,783 B1 | 11/2002 | Hausladen et al. | |
| 7,014,729 B2 | 3/2006 | Grabau et al. | |
| 7,045,186 B2 | 5/2006 | Grabau et al. | |
| 7,388,504 B2 | 6/2008 | Mess | |
| 7,782,212 B2 * | 8/2010 | Burns | B65D 51/20 340/10.1 |
| 2006/0125641 A1 * | 6/2006 | Forster | G06K 17/0025 340/572.8 |
| 2006/0290498 A1 * | 12/2006 | Rawlings | G06K 19/07749 340/572.1 |
| 2008/0018479 A1 * | 1/2008 | Hashimoto | G06K 19/07749 340/572.8 |
| 2008/0073800 A1 * | 3/2008 | Finn | G06K 19/07745 257/784 |
| 2008/0155822 A1 * | 7/2008 | Finn | G06K 19/07745 29/832 |
| 2011/0017832 A1 * | 1/2011 | Ritamaki | G06K 19/0773 235/492 |
| 2012/0067963 A1 * | 3/2012 | Margulis | G06K 19/07749 235/492 |
| 2016/0140431 A1 * | 5/2016 | Bousquet | G06K 19/0775 235/488 |

* cited by examiner

METHODS AND APPARATUS FOR SUPPORTING RADIO FREQUENCY IDENTIFICATION TAGS

RELATED APPLICATION

This patent claims priority to U.S. Provisional Application Ser. No. 62/109,872 filed on Jan. 30, 2015, which is hereby incorporated herein by reference in its entirety.

FIELD OF THE DISCLOSURE

The present disclosure relates generally to radio frequency identification tags and, more particularly, to methods and apparatus for supporting radio frequency identification tags.

BACKGROUND

Radio-frequency identification (RFID) may be utilized to identify and/or track objects. An RFID system generally includes an RFID tag attached to and/or embedded in an object and an RFID reader to detect the RFID tag by transmitting signals to and receiving return signals from the RFID tag.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Radio-frequency identification (RFID) systems are often employed to identify and/or track inventory and/or other assets. RFID systems generally include an RFID label, tag, or inlay that is attached to an object (e.g., a package) and a RFID reader that detects the RFID tag. In operation, the RFID reader transmits a signal to search for the RFID tag, the RFID tag receives the signal, and the RFID tag subsequently sends a return signal with identification information of the RFID tag and/or of the associated object to the RFID reader.

RFID tags or inlays include an antenna to receive and transmit signals and an integrated circuit or chip to process and/or store data. In some examples, the RFID tags are active tags that use local power to power the integrated circuit and communication with the RFID reader. In other examples, the RFID tags are passive tags that utilize electromagnetic energy received from the RFID reader to power the integrated circuit and communicate with the RFID reader. Still other examples include RFID tags that are semi-passive or battery-assisted passive tags that use local power for the integrated circuit and use electromagnetic energy received from the RFID reader to communicate with the RFID reader.

To enable an RFID reader to associate an RFID tag with a particular object, the RFID tag is coupled to a surface of the object. However, some materials (e.g., water, metals) reflect radio-frequency signals back to the RFID reader in a similar manner as the RFID tags, thereby creating false reads of an RFID tag returning signals to the RFID reader. Further, coupling passive RFID tags to a metal surface may detune the antenna of the RFID tag and, thus, prevent the RFID tag from receiving enough energy via the electromagnetic signals to transmit a return signal back to the RFID reader. Thus, the RFID tag and the RFID reader of some known RFID systems do not communicate properly when the RFID tag is coupled closely to a metal surface.

To reduce and/or eliminate the effects of metal surfaces on passive RFID tags, some known RFID systems couple the RFID tag to a standoff composed of a layer of absorbent material (e.g., foam) that is to be positioned between the RFID tag and the metal surface. Such RFID tag standoffs are large and bulky and, thus, are impractical for applications in which space is limited. Moreover, some known standoffs having a layer of absorbent material are produced via a web roll manufacturing process. The thickness of the absorbent material reduces a number of standoffs produced per roll and/or substantially impairs (e.g., prevents) a web from being fed through a label applicator device. In addition, a web roll may produce an uneven shape of the absorbent material and, thus, an uneven shape of the standoffs.

To reduce a thickness of an RFID tag standoff during a manufacturing process, some known RFID tag standoffs include an expandable absorbent material. In such known examples, the absorbent material is compressed during the manufacturing process and is subsequently expanded to separate the RFID tag from a surface (e.g., a metal surface) when the standoff is applied to the surface. Such known RFID tag standoffs must be exposed to an energy source to cause the absorbent material to expand. As a result, such known RFID tag standoffs require an additional step of exposing the standoff to an energy source and require an additional device to provide such an energy source, thereby increasing manufacturing and installation costs.

Further, an RFID tag is difficult to remove from such standoffs after the RFID tag is fixed to the layer of absorbent material. As a result, a distance between a surface and an RFID tag that is produced and/or manufactured with a layer of expanded absorbent material cannot be adjusted without damaging the RFID tag.

The example RFID tag standoffs disclosed herein enable a distance between an RFID tag and a surface to be adjustable. As a result, the example RFID tag standoffs substantially reduce the risk of a metal surface detuning an RFID tag, a reflective surface (e.g., water, metal) reflecting a signal of an RFID reader, and/or a nearby object damaging the RFID tag.

In some examples, the RFID tag standoff includes a face layer or face sheet that defines a tag seat and a plurality of extensions extending from respective edges of the tag seat. An adhesive layer is applied to at least a portion of an inner surface of the face layer, and an RFID tag is coupled to the inner surface of the tag seat via the adhesive layer. To enable the RFID tag to be spaced apart from a surface (e.g., a metal surface), outer portions of one or more of the extensions are coupled to the surface via the adhesive layer and inner portions of the one or more extensions are flexed away from the surface. In some examples, the outer portions that couple to the surface are adjustable to enable a user to adjust the distance between the RFID tag and the surface. In some examples, the additional extension(s) couple to the surface to provide further support to the RFID standoff or couple together in a gap between the RFID tag and the surface to partially cover the RFID tag. In some examples, a substrate layer is coupled to a portion of the tag seat of the RFID tag standoff via the adhesive layer such that the RFID tag is disposed between the face layer and the substrate layer to be protected from the environment.

An example apparatus disclosed herein includes a face layer. The face layer includes a tag seat, a first extension extending from a first edge of the tag seat, and a second extension extending from a second edge of the tag seat. The second edge is opposite the first edge. The face layer includes a third extension extending from a third edge of the tag seat and a fourth extension extending from a fourth edge of the tag seat. The fourth edge is opposite the third edge. The example apparatus includes an adhesive layer applied to at least a portion of an inner surface of the face layer. The adhesive layer is to enable the first extension and the second extension to couple to a surface. The example apparatus includes an RFID tag coupled to the tag seat. The RFID tag is to be spaced apart from the surface when outer portions of the first extension and the second extension are coupled to the surface and inner portions of the first extension and the second extension are flexed away from the surface.

In some examples, the example apparatus further includes a liner coupled to the adhesive layer. The liner is to be removed from the adhesive layer to enable the adhesive layer to couple to the surface.

In some examples, the third and fourth edges of the tag seat include lines of weakness to enable the third extension and the fourth extension to bend without arching the tag seat.

In some examples, the first extension, the second extension, the third extension, and the fourth extension enable the RFID tag to be substantially parallel to the surface.

In some examples, at least a portion of the third extension and the fourth extension are to couple to the surface to support the tag seat.

In some examples, the third extension and the fourth extension are to couple together between the surface and the tag seat to partially cover the RFID tag. In such examples, an outer portion of the third extension is coupled to an inner portion of the fourth extension and an outer portion of the fourth extension is coupled to the surface.

In some examples, the face layer is composed of a paper material or a synthetic material.

In some examples, the example apparatus further includes a substrate layer that is to receive the RFID tag. The substrate layer is to couple to the adhesive layer to position the RFID tag between the face layer and the substrate layer. In such examples, the substrate layer is coupled to the tag seat and the third and fourth extensions via the adhesive layer such that portions of the tag seat and the third and fourth extensions remain uncovered by the substrate layer.

In some examples, the outer portions that are to couple to the surface are adjustable to enable a distance between the tag seat and the surface to be adjustable.

An example method disclosed herein includes applying an adhesive layer to at least a portion of an inner surface of a face web that includes a first flexible substrate and a tag seat and coupling an RFID tag to the inner surface of the tag seat. The example method includes cutting the face web to define the tag seat, first extensions extending from opposing first and second edges of the tag seat, and second extensions extending from opposing third and fourth edges of the tag seat.

In some examples, the example method further includes decoupling a liner web from the inner surface of the face web before the RFID tag is coupled to the face web and coupling the liner web to the inner surface of the face web after the RFID tag is coupled to the face web.

In some examples, coupling the RFID tag to the inner surface of the tag seat includes coupling the RFID tag to an inner surface of a substrate web that includes a second flexible substrate, trimming the substrate web to define a substrate layer, and coupling the substrate layer to the face web. Portions of the tag seat and the second extensions of the face web are to remain uncovered by the substrate layer when the substrate layer is coupled to the face web.

In some examples, the example method further includes applying a transfer tape or a pressure-sensitive adhesive to couple the substrate layer to the face web.

In some examples, the example method further includes forming lines of weakness along at least a portion of the third edge and the fourth edge of the tag seat of the face web to enable the second extensions to bend along the third edge and the fourth edge.

An example web assembly system disclosed herein includes a face web roll to move a face web that includes a first flexible substrate, an adhesive applicator to apply an adhesive layer to at least a portion of an inner surface of the face web, and an RFID tag web roll assembly to couple an RFID tag to the inner surface of a tag seat of the face web. The example web assembly system includes a first cutter to cut the face web to define the tag seat, first extensions extending from opposing first and second edges of the tag seat, and second extensions extending from opposing third and fourth edges of the tag seat.

In some examples, the example web assembly system further includes a first liner roll to decouple a liner web from the inner surface of the face web before the RFID tag web roll assembly couples the RFID tag to the face web and a second liner roll to couple the liner web to the inner surface of the face web after the RFID tag web roll assembly couples the RFID tag to the face web.

In some examples, the RFID tag web roll assembly includes a substrate web roll to move a substrate web that includes a second flexible substrate, an RFID tag web roll to couple the RFID tag to an inner surface of the substrate web, a second cutter to define a substrate layer from the substrate web, and a substrate layer roll to couple the inner surface of the substrate layer to the tag seat and the second extensions of the face web via the adhesive layer. Portions of the tag seat and the second extensions of the face web are to remain uncovered by the substrate layer when the substrate layer is coupled to the face web.

In some examples, the example web assembly system further includes a tape roll or a pressure-sensitive adhesive applicator to couple the substrate layer to the face web.

In some examples, the example web assembly system further includes a third cutter to form lines of weakness along at least a portion of the third edge and the fourth edge of the tag seat of the face web to enable the second extensions to bend along the third edge and the fourth edge.

Figure 1:
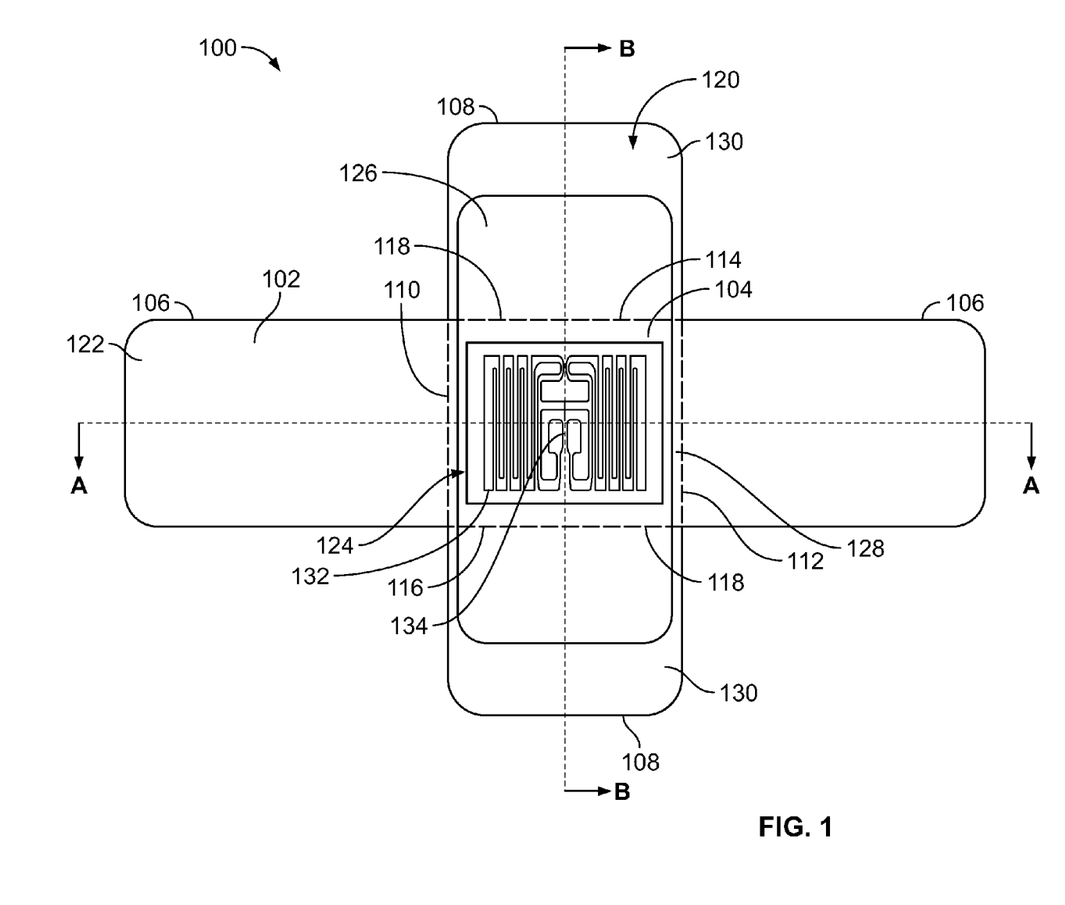
FIG. 1 is a bottom view of an example RFID tag standoff in accordance with the teachings of this disclosure.

Turning to the figures, FIG. 1 is a bottom view of an example RFID tag standoff 100 disclosed herein. The example RFID tag standoff 100 includes a face layer or face sheet 102 that defines a tag seat 104, first extensions 106, and second extensions 108. In the illustrated example, there are two first extensions 106 and two second extensions 108. Also, in the illustrated example, one of the first extensions 106 extends from a first edge 110 of the tag seat 104, and another of the first extensions 106 extends from a second edge 112 opposite the first edge 110. One of the second extensions 108 extends from a third edge 114 of the tag seat 104, and another of the second extensions 108 extends from a fourth edge 116 opposite the third edge 114. As illustrated in FIG. 1, the third edge 114 and the fourth edge 116 of the tag seat 104 include lines of weakness 118 that enable the second extensions 108 to bend or fold along the respective third and fourth edges 114, 116.

In the illustrated example, an adhesive layer 120 of the example RFID tag standoff 100 is applied to at least a portion of an inner surface 122 of the face sheet 102. Also, in some examples, the adhesive layer 120 is applied to all portions of the inner surface 122 of the face sheet 102 such that no portion of the inner surface 122 is uncovered from the adhesive layer 120. As illustrated in FIG. 1, the example RFID tag standoff 100 includes an RFID tag or inlay 124 coupled to a substrate layer 126. The substrate layer 126 is coupled to the tag seat 104 and the second extensions 108 of the face sheet 102 via the adhesive layer 120 such that the RFID tag 124 aligns with tag seat 104 of the face sheet 102. As illustrated in FIG. 1, the surface area of the substrate layer 126 is smaller than the combined surface area of the tag seat 104 and the second extensions 108. As a result, a portion 128 of the adhesive layer 120 applied to the tag seat 104 and a portion 130 of the adhesive layer 120 applied to each of the second extensions 108 remain exposed when the substrate layer 126 is coupled to the adhesive layer 120.

The RFID tag 124 of the illustrated example includes an antenna 132 and an integrated circuit or chip 134. The antenna 132 of the RFID tag 124 receives signals from and transmits signals to an RFID reader. The chip 134 of the illustrated example processes signals received from the RFID reader and/or stores data that is to be sent to the RFID reader when the antenna 132 transmits a signal to the RFID reader. In the illustrated example, the RFID tag 124 is a passive tag that powers the chip 134 and the antenna 132 via electromagnetic energy received from the RFID reader. In other examples, the RFID is an active tag or a semi-passive tag.

The RFID tag standoff 100 of the illustrated example enables a user to identify and/or track objects (e.g., inventory and/or other assets). In some examples, the RFID tag standoff 100 is coupled to a surface of an object. When the object and, thus, the RFID tag 124 coupled to the object are within a transmission range of the RFID reader, the RFID tag 124 receives power via electromagnetic energy transmitted from the RFID reader to power the RFID tag 124. In turn, the antenna 132 receives a radio-frequency signal transmitted by the RFID reader and subsequently transmits a return signal that includes identification information stored on the chip 134 of the RFID tag 124. Because the RFID tag standoff 100 is coupled to the object, the identification information stored on the RFID tag 124 of the RFID tag standoff 100 is associated with the object. Thus, when the RFID reader receives the return signal transmitted by the RFID tag 124, the user is able to associate the received return signal with the object.

Figure 2:
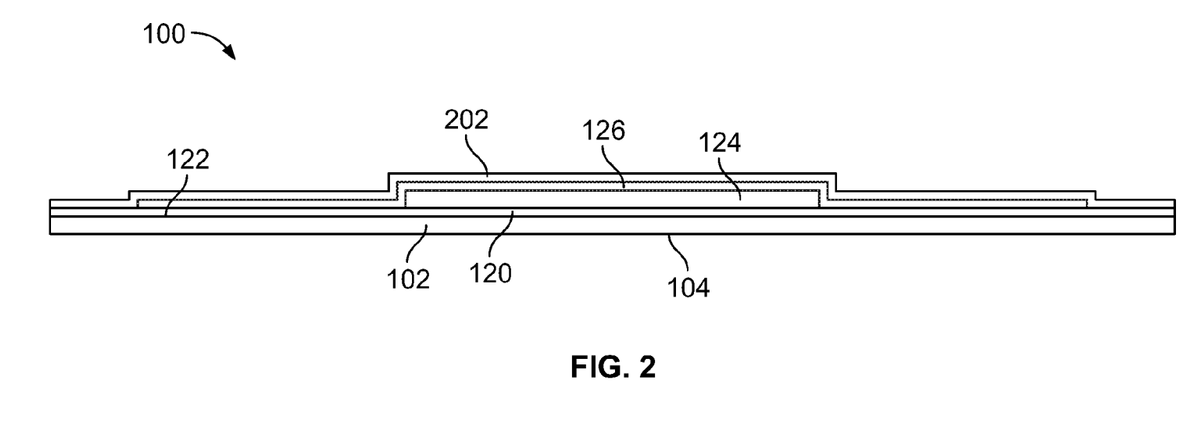
FIG. 2 is a cross-sectional view of the example RFID tag standoff of FIG. 1 taken along line A-A of FIG. 1.

FIG. 2 is a cross-sectional view of the example RFID tag standoff 100 taken along line A-A of FIG. 1. In the illustrated example, the RFID tag standoff 100 is uncoupled from a surface of an object. As illustrated in FIG. 2, the adhesive layer 120 is applied to the inner surface 122 of the face sheet 102 such that all portions of the inner surface 122 are covered by the adhesive layer 120. In the illustrated example, the face sheet 102 is composed of a paper material to enable the tag seat 104 to be flexed away from the surface of the object. In some examples, the face sheet 102 is composed of a synthetic material and/or another flexible or resilient material that enables the tag seat 104 to be flexed away from the surface of the object. In some examples, the adhesive layer 120 is composed of acrylic transfer tape or hot-melt pressure-sensitive adhesive. In some examples, the face sheet 102 and/or the adhesive layer 120 is composed of the water-resistant material to enable the RFID tag standoff 100 to be installed in wet and/or moist environments.

In the illustrated example, the RFID tag 124 is coupled, applied and/or printed to the substrate layer 126. The substrate layer 126 is coupled to the adhesive layer 120 such that RFID tag 124 is disposed between the substrate layer 126 and the face sheet 102. In some examples, the substrate layer 126 is composed of a flexible material such as polyethylene terephthalate (PET) and/or other suitable material(s) or combination of material(s) to protect the RFID tag 124 from the environment.

As illustrated in FIG. 2, a liner 202 is coupled to the adhesive layer 120. The liner 202 prevents the adhesive layer 120 from unintentionally contacting and/or coupling to an object not associated with the RFID tag 124, for example, prior to the application of the RFID tag 124 prior to an object. As illustrated in FIG. 2, the substrate layer 126 and the RFID tag 124 are disposed between the liner 202 and the face sheet 102 when the liner 202 is coupled to the adhesive layer 120. The liner 202 is removed (e.g., peeled) and the RFID tag standoff 100 is inverted prior to applying the RFID tag standoff 100 to an object (as shown below).

Figure 3:
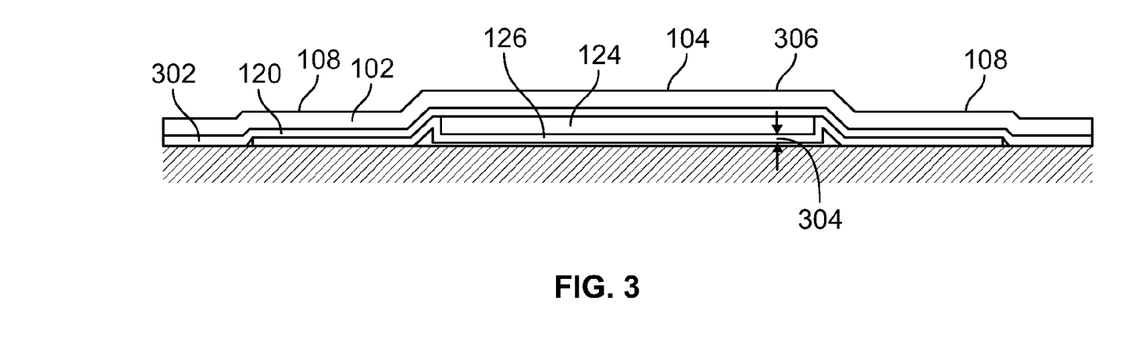
FIG. 3 is a cross-sectional view of the example RFID tag standoff of FIG. 1 taken along line B-B of FIG. 1 with example extensions in a first position.
Figure 4:
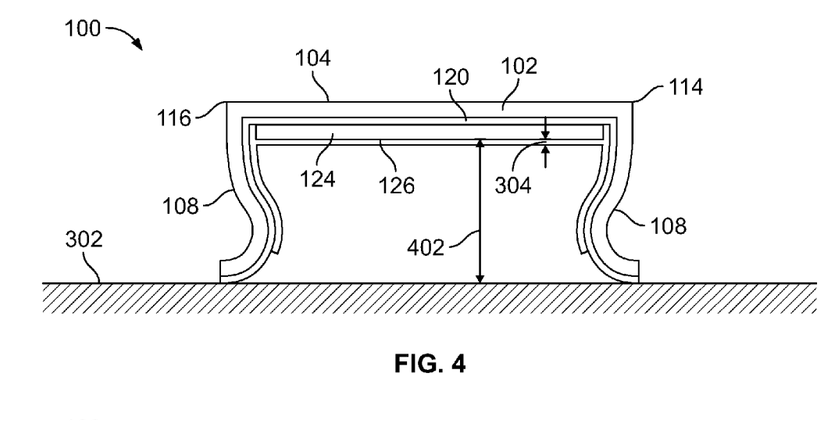
FIG. 4 is a cross-sectional view of the example RFID tag standoff of FIG. 1 taken along line B-B of FIG. 1 with the example extensions in a second position.
Figure 5:
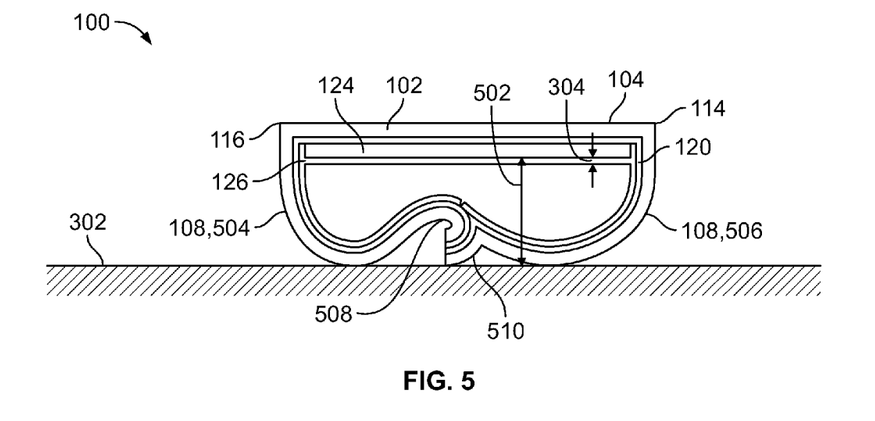
FIG. 5 is a cross-sectional view of the example RFID tag standoff of FIG. 1 taken along line B-B of FIG. 1 with the example extensions in a third position.

FIGS. 3-5 are cross-sectional views of the RFID tag standoff 100 taken along line B-B of FIG. 1 when the RFID tag standoff 100 is inverted from the orientation of FIG. 2 and coupled to a surface 302 of an object (e.g., a package). FIG. 3 illustrates the RFID tag standoff 100 coupled to the surface 302 in a first position, FIG. 4 illustrates the RFID tag standoff 100 coupled to the surface 302 in a second position, and FIG. 5 illustrates the RFID tag standoff 100 coupled to the surface 302 in a third position. As illustrated in FIGS. 3-5, the liner 202 (FIG. 2) is decoupled from the adhesive layer 120 when the RFID tag standoff 100 is coupled to the surface 302.

As illustrated in FIG. 3, the second extensions 108 are coupled to the surface 302 in the first position. In the illustrated example, the substrate layer 126 engages and/or is adjacent the surface 302 such that the RFID tag 124 is separated from the surface 302 by approximately a thickness 304 of the substrate layer 126. When the RFID tag standoff 100 is in the first position, the first extensions 106 (FIG. 1)

and the second extensions 108 are coupled to the surface 302 via the adhesive layer 120. In the first position, the first and second extensions 106, 108 provide support to the RFID tag 124 and/or protect the RFID tag 124 from the environment. In some examples, the portion 128 (FIG. 1) of the adhesive layer 120 applied to the tag seat 104 couples to the surface 302 to provide further support and/or protection to the RFID tag 124. In some examples, text and/or images including human readable and/or machine readable indicia are printed on an outer surface 306 of the face sheet 102 to enable the RFID tag standoff 100 to function as a label.

As illustrated in FIG. 3, the RFID tag standoff 100 is substantially flat and/or flush with the surface 302 in the first position. As a result, the RFID tag standoff 100 may be coupled to the surface 302 in the first position when there is limited space adjacent the surface 302 and/or when there is risk of a nearby object damaging the RFID tag 124. Further, because the RFID tag 124 is near the surface 302 in the first position, the example RFID tag standoff 100 may be oriented in the first position when there is relatively less risk of the surface 302 detuning the antenna 134 (FIG. 1) and/or reflecting radio-frequency signals to create false reads of the RFID tag 124. For example, the example RFID tag standoff 100 may be coupled to the surface 302 in the first position when the surface 302 is composed of a non-metallic material.

FIG. 4 is a cross-sectional view of the RFID tag standoff 100 in the second position. As illustrated in FIG. 4, the RFID tag 124 is spaced apart from the surface 302 by a distance 402 that is substantially greater than the thickness 304 of the substrate layer 126. In some examples, the distance 402 substantially increases performance of the RFID tag 124. For example, when the surface 302 is composed of metallic material, the distance 402 substantially reduces the risk of the surface 302 detuning the antenna 132 (FIG. 1) and substantially reduces the risk of the surface 302 reflecting radio-frequency signals to create false reads of the RFID tag 124. Further, if a layer or droplets of water form on the surface 302, the distance 402 substantially reduces the risk of the water creating false reads by reflecting the radio-frequency signals back to the RFID reader.

As illustrated in FIG. 4, the second extensions 108 are bent, rotated and/or folded along the third and fourth edges 114, 116 and toward the surface 302 to enable the portion of the adhesive layer 120 applied to the second extensions 108 to engage the surface 302. The second extensions 108 and the first extensions 106 (FIG. 1) couple to the surface 302 to provide structural support to the RFID tag standoff 100. In some examples, the lines of weakness 118 (FIG. 1) enable the second extensions 108 to bend, rotate and/or fold about the respective third and fourth edges 114, 116 without bending and/or rotating the tag seat 104 of the face sheet 102. Thus, because the RFID tag 124 is coupled to the tag seat 104, the lines of weakness 118 enable the RFID tag 124 to be substantially parallel to the surface 302 when the RFID tag standoff 100 is in the second position. Positioning the RFID tag 124 parallel to the surface 302 substantially improves communication between the RFID tag 124 and the RFID reader.

FIG. 5 is a cross-sectional view of the RFID tag standoff 100 in the third position. In the illustrated example, the RFID tag 124 is spaced apart from the surface 302 by a distance 502 that is substantially greater than the thickness 304 of the substrate layer 126. Thus, similar to the second position of the RFID tag standoff 100, the third position substantially reduces the risk of the surface 302 detuning the antenna 132 (FIG. 1) and substantially reduces the risk of the surface 302 and/or a layer or droplets of water reflecting radio-frequency signals of the RFID reader to create false reads of the RFID tag 124.

When the RFID tag standoff 100 is in the third position, the first extensions 106 (FIG. 1) couple to the surface 302 to provide structural support to the RFID tag standoff 100. As illustrated in FIG. 5, the second extensions 108 are bent, rotated and/or folded along the third and fourth edges 114, 116 toward the surface 302. In some examples, the lines of weakness 118 (FIG. 1) enable the second extensions 108 to bend, rotate and/or fold about the respective third and fourth edges 114, 116 without bending and/or rotating the tag seat 104 of the face sheet 102. Thus, because the RFID tag 124 is coupled to the tag seat 104, the lines of weakness 118 enable the RFID tag 124 to be substantially parallel to the surface 302 when the RFID tag standoff 100 is in the third position. Positioning the RFID tag 124 parallel to the surface 302 substantially improves communication between the RFID tag 124 and the RFID reader.

In the illustrated example, the second extensions 108 include a primary extension 504 and an opposed extension 506. The primary extension 504 and the opposed extension 506 are bent, rotated and/or folded along the corresponding fourth and third edges 116, 114 such that the second extensions 108 couple together between the tag seat 104 of the RFIG tag 124 and the surface 302. As a result, the primary extension 504 and the opposed extension 506 partially cover and/or protect the RFID tag 124 from the environment and/or nearby objects.

As illustrated in FIG. 5, the adhesive layer 120 applied to an end 508 of the primary extension 504 engages the adhesive layer 120 applied to an end 510 of the opposed extension 506. In some examples, the end 508 of the primary extension 504 and the end 510 of the opposing extension 506 are bent, rotated and/or folded to enable the adhesive layer 120 applied to the end 508 to couple to the adhesive layer 120 applied to the end 510. By coupling together the adhesive layer 120 that is applied to the ends 508, 510 of the secondary extensions 108, substantially no portion of the adhesive layer 120 of the second extension 108 is exposed to the environment. As a result, the adhesive layer 120 of the second extension 108 of the RFID tag standoff 100 is prevented from unintentionally contacting and/or coupling to an object. For example, the third position of the example RFID tag standoff 100 prevents the primary extension 504 and the opposed extension 506 from unintentionally coupling to and/or sticking to the RFID tag 124, which would impair performance of the RFID tag 124. Accordingly, the RFID tag standoff 100 increases performance of the RFID tag 124 when in the third position by providing further structural support and protection from the environment.

The adjustability of the RFID tag standoff 100 enables the RFID tag 124 to be coupled to an object in different environments. In some examples, if the object is composed of non-reflective material (e.g., non-metallic material) and/or if there is risk of nearby objects damaging or dislodging the RFID tag 124, the RFID tag standoff 100 may be coupled to the object in the first position illustrated in FIG. 3. In some examples, the RFID tag standoff 100 is coupled to the object in the second position illustrated in FIG. 4 or the third position of FIG. 5 if the object is composed of metallic material and/or to provide further structural support for the RFID tag standoff 100.

Figure 6:
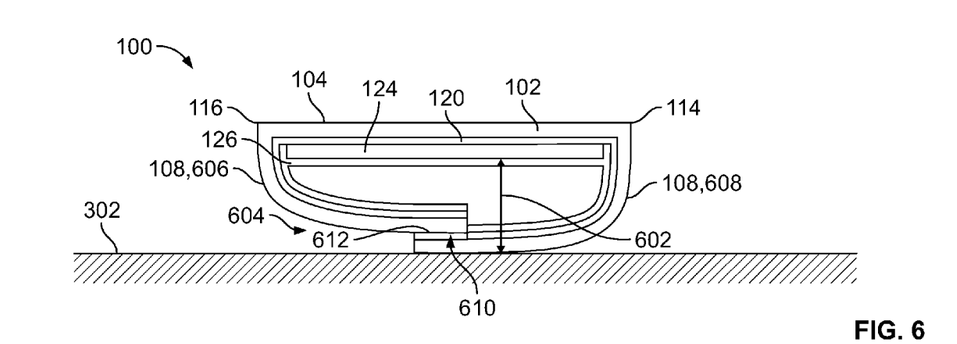
FIG. 6 is a cross-sectional view of the example RFID tag standoff of FIG. 1 with the example extensions in a fourth position.

FIG. 6 is a cross-sectional view of the example RFID tag standoff 100 in a fourth position. In the illustrated example, the RFID tag 124 of the RFID tag standoff 100 is spaced apart from the surface 302 by a distance 602 that substantially reduces the risk of the surface 302 detuning an antenna (e.g., the antenna 132 of FIG. 1) and substantially reduces the risk of the surface 302 and/or a layer or droplets of water reflecting radio-frequency signals of the RFID reader from creating false reads of the RFID tag 124.

When the RFID tag standoff 100 is in the fourth position, first extensions (e.g., the first extensions 106 of FIG. 1) couple to the surface 302 to provide structural support to the RFID tag standoff 100. In the illustrated example, the second extensions 108 are bent, rotated and/or folded along the third and fourth edges 114, 116 such that the second extensions 108 couple together in a gap 604 between the tag seat 104 of the RFIG tag 124 and the surface 302.

In some examples, the lines of weakness 118 (FIG. 1) enable the second extensions 108 to bend, rotate and/or fold about the respective third and fourth edges 114, 116 without bending and/or rotating the tag seat 104 of the face sheet 102. As a result, the lines of weakness 118 enable the RFID tag 124 to be substantially parallel to the surface 302 and, thus, substantially improve communication between the RFID tag 124 and the RFID reader when the RFID tag standoff 100 is in the third position.

As illustrated in FIG. 6, the second extensions 108 include a primary extension 606 and an opposed extension 608. In this example, the substrate layer 126 is extended to fully cover the adhesive layer 120 applied to the primary extension 606 partially covers the adhesive layer 120 applied to the opposed extension 608. In this example, substantially no portion of the adhesive layer 120 applied to the primary extension 606 is exposed to the environment.

In the illustrated example, the adhesive layer 120 of an exposed end 610 of the opposed extension 608 engages an outer surface 612 of the primary extension 606. In some examples, the primary and opposed extensions 606, 608 couple together between the tag seat 104 and the surface 302 to partially cover and/or protect the RFID tag 124 from the environment and/or nearby objects. Because the exposed end 610 of the opposed extension 608 is covered by the outer surface 612 of the primary extension 606, substantially no portion of the adhesive layer 120 applied to the second extensions 108 is exposed when the RFID tag standoff 100 in the fourth position. As a result, the second extensions 108 are prevented from coupling to and/or sticking to the RFID tag 124, which could impair performance of the RFID tag 124 if the second extensions 108 engage, contact and/or are pressed against the RFID tag 124.

Figures 7, 8:
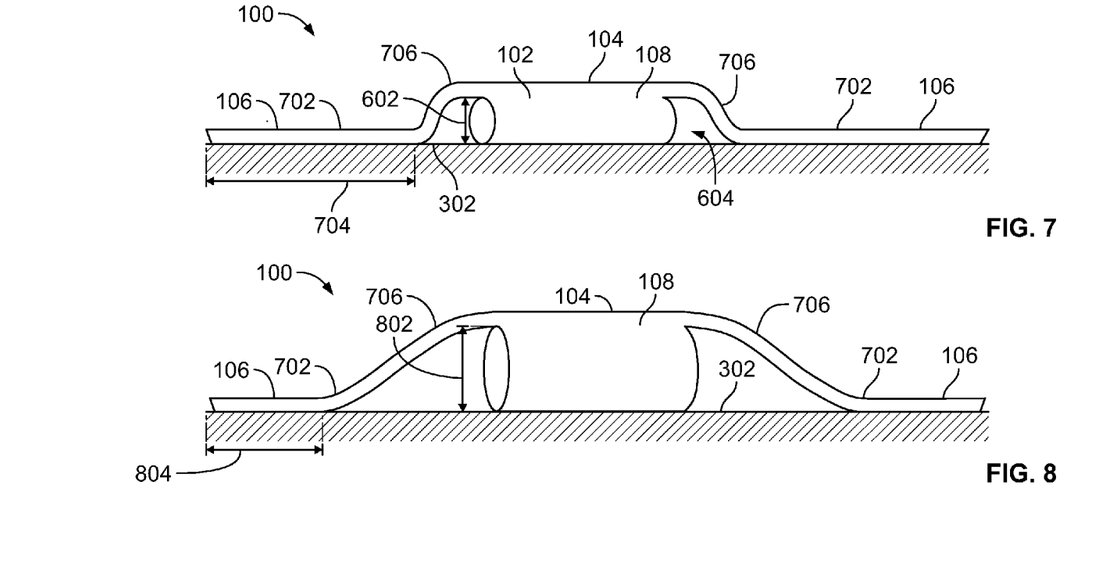
FIG. 7 is a side view of the example RFID tag standoff of FIG. 6.
FIG. 8 is a side view of the example RFID tag standoff of FIG. 6 in a fifth position.

FIG. 7 is a side view of the RFID tag standoff 100 in the fourth position. In the illustrated example, the RFID tag 124 (FIG. 6) is spaced apart from the surface 302 by the distance 602, and the second extensions 108 couple together in the gap 604 between the tag seat 104 of the RFIG tag support 100 and the surface 302. As also shown in FIG. 6, the second extensions 108 in this position form a rolled-up structure. In the illustrated example, an outer portion 702 of each of the first extensions 106 has a length 704 and couples to the surface 302. A remaining inner portion 706 of each of the first extensions 106 flexes away from the surface 302 to space the RFID tag 124 away from the surface 302. As illustrated in FIG. 7, the positioning of each of the first extensions 106 is substantially symmetrical to enable the tag seat 104 and, thus, the RFID tag 124 coupled to the tag seat 104 to be substantially parallel to the surface 302.

Because the face sheet 102 is composed of flexible and/or resilient material and the adhesive layer 120 (FIG. 6) covers substantially an entire inner surface (e.g., the inner surface 122 of FIG. 1) of the face sheet 102, the distance between the surface 302 and the RFID tag 124 is adjustable by altering a length (e.g., the length 704 in the third position) of the outer portion 702 of the first extensions 106 that couple to the surface 302.

FIG. 8 is a side view of the RFID tag standoff 100 in a fifth position. As illustrated in FIG. 8, the second extensions 108 are coupled together in the fifth position in a similar manner as in the fourth position (e.g., rolled-up) of the RFID tag standoff 100. Thus, the second extensions 108 partially cover and/or protect the RFID tag 124 (FIG. 6) when coupled together regardless of a distance (e.g., the distance 602 of FIG. 7, a distance 802 of FIG. 8) between the RFID tag 124 and the surface 302.

As illustrated in FIG. 8, the outer portions 702 of the first extensions 106 that couple to the surface 302 have a length 804 in the fifth position of the RFID tag standoff 100 that is less than the corresponding length 704 in the first position (FIG. 7). The remaining inner portion 706 of each of the first extensions 106 is increased and, thus, flexes the tag seat 104 farther away from the surface 302 relative to the fourth position of the RFID tag standoff 100. As a result, the distance 802 between the RFID tag 124 and the surface 302 in the fifth position (FIG. 8) is greater than the corresponding distance 602 in the fourth position (FIG. 7).

Thus, the adjustability of the RFID tag standoff 100 enables the RFID tag 124 to be coupled to an object in different environments. For example, the RFID tag standoff 100 is coupled to the object in the fourth position illustrated in FIGS. 6-7 and/or the fifth position illustrated in FIG. 8 if the object is composed of metallic material and/or the RFID tag 124 requires further protection from the environment. In some examples, the RFID tag standoff 100 is adjusted to the fifth position illustrated in FIG. 8 if the RFID tag 124 is not communicating properly with the RFID reader in the fourth position. For example, the RFID tag standoff 100 is coupled to the object in the fourth position when the object is composed of a first metallic material and is coupled to the object in the fifth position when the object is composed of a second metallic material having different reflective properties than the first metallic material.

Figure 9:
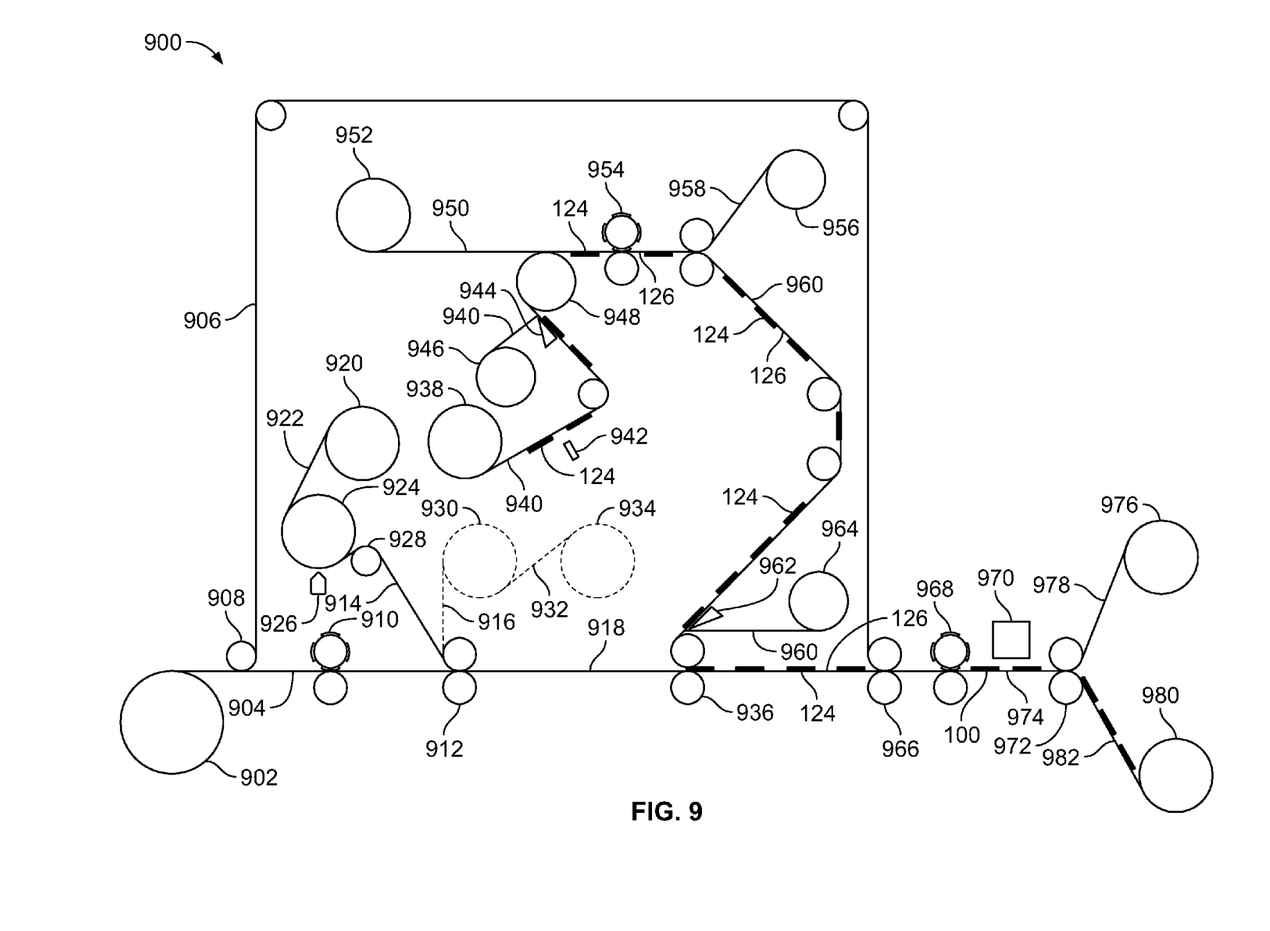
FIG. 9 is a schematic of an example apparatus to manufacture the example RFID tag standoff of FIG. 1.

FIG. 9 is a schematic of an example apparatus 900 used to manufacture the example RFID tag standoff 100 of FIGS. 1-8. The example apparatus 900 is discussed below in connection with the example RFID tag standoff 100 of FIGS. 1-8. Because the example apparatus 900 may be used to manufacture the example RFID tag standoff 100 of FIGS. 1-8, those components identified in FIGS. 1-8 having functions substantially similar or identical to the functions of components described in FIG. 9 will not be described in detail again. Instead, the same reference numbers will be used for like structures.

As illustrated in FIG. 9, a face web roll 902 provides a substrate web (e.g., a paper web, a face sheet web) 904 coupled to a liner web 906. As the substrate web 904 moves from the face web roll 902, a first liner roll 908 decouples the liner web 906 from the substrate web 904. A cutter (e.g., a die cutter) 910 forms lines of weakness (e.g., the lines of weakness 118 of FIG. 1 that enable the second extensions 108 to bend, rotate and/or fold).

In the illustrated example, laminating rolls 912 apply a first adhesive web 914 or a second adhesive web 916 to a surface 918 of the substrate web 904. In some examples, the laminating rolls 912 apply pressure to the substrate web 904 and the first or second adhesive web 914, 916 as the respective first or second adhesive web 914, 916 engages the surface 918 of the substrate web 904. In examples in which the first adhesive web 914 is applied to the substrate web 904, a roll 920 provides a liner web 922 to another roll 924.

As the liner web 922 passes around the roll 924, an applicator 926 applies an adhesive material (e.g., hot-melt pressure-sensitive adhesive material, permanent adhesive material, temporary adhesive material) to the liner web 922. The liner web 922 subsequently passes a roll 928 coated with a release surface to form the first adhesive web 914 that is to be applied to the substrate web 904. In examples in which the second adhesive web 916 is applied to the substrate web 904, a tape roll 930 removes a liner web 932 from the second adhesive web 916 and the liner web 932 is collected about a liner rewind 934. The second adhesive web 916 includes a layer of adhesive material (e.g., acrylic adhesive material) that is to be applied to the substrate web 904 at the laminating rolls 912.

After the first adhesive web 914 or the second adhesive web 916 is applied to the surface 918 of the substrate web 904, the substrate layer 126 and the RFID tag or inlay 124 are applied to the surface 918 of the substrate web 904 via a substrate roll 936. To couple the RFID tag 124 to the substrate layer 126, an RFID roll 938 provides a film carrier 940 on which the RFID tag 124 is initially coupled. In some examples, the film carrier 940 passes the RFID tag 124 by a scanner 942 to establish a registration signal for the RFID tag 124. A peel station 944 removes the RFID tag 124 from the film carrier 940 and is collected about a film carrier rewind 946. Upon the RFID tag 124 being removed from the film carrier 940, a placing roll 948 applies or couples the RFID tag 124 to a substrate web 950 provided by a substrate web roll 952.

After the RFID tag 124 is coupled to the substrate web 950, a cutter (e.g., a die cutter) 954 trims the substrate web 950 to define the substrate layer 126. In some examples, the cutter 954 trims the substrate web 950 such that the substrate layer 126 is to couple to a tag seat (e.g., the tag seat 104 of FIG. 1) and/or second extensions (e.g., the second extensions 108 of FIG. 1) of the RFID tag standoff 100. For example, the cutter 954 trims the substrate web 950 such that portions of the tag seat 104 and the second extensions 108 of the RFID tag standoff 100 are to remain uncovered by the substrate layer 126. Upon the substrate web 950 passing through the cutter 954, a rewind web 956 collects excess material 958 of the substrate web 950 that was separated from the substrate layer 126 by the cutter 954.

As illustrated in FIG. 9, the substrate layer 126 and the RFID tag 124 are carried toward the substrate web 904 via a film carrier 960. A peel station 962 separates the substrate layer 126 and the RFID tag 124 from the film carrier 960, and the film carrier 960 is collected by a film carrier rewind 964. After the film carrier 960 is separated from the substrate layer 126, the substrate roll 936 applies or couples the substrate layer 126 and the RFID tag 124 to the surface 918 of the substrate web 904. As illustrated in FIG. 9, the liner web 906 is recoupled to the surface 918 of the substrate web 904 via second liner rolls 966. For example, the liner web 906 is coupled to the substrate web 904 via the first adhesive web 914 or the second adhesive web 916 such that the substrate layer 126 and the RFID tag 124 are disposed between the liner web 906 and the substrate web 904.

In the illustrated example, a cutter (e.g., a die cutter) 968 trims or cuts the substrate web 904, the first or second adhesive web 914, 916 and/or the liner web 906 to define first extensions (e.g., the first extensions 106 of FIG. 1), the second extensions 108, a face sheet (e.g., the face sheet 102 of FIG. 1), and the tag seat 104 of the RFID tag standoff 100. In some examples, the RFID tag standoff 100 passes an RFID reader 970 to verify that the RFID tag 124 has not been damaged while the RFID tag standoff 100 is formed. In some examples, the RFID tag standoff 100 passes through printing rolls 972 that print indicia (e.g., labels, advertisements, instructions) on a surface 974 of the substrate web 904 opposite the surface 918 via, for example, thermal transfer printing. In other examples, the indicia are printed on the surface before the RFID tag 124 is coupled to the substrate web 904. As illustrated in FIG. 9, a rewind web 976 collects excess material 978 separated from the RFID tag standoff 100 by the cutter 968, and a rewind web 980 collects the RFID tag standoff 100 formed by the apparatus 900 via a label web 982.

Figure 10:
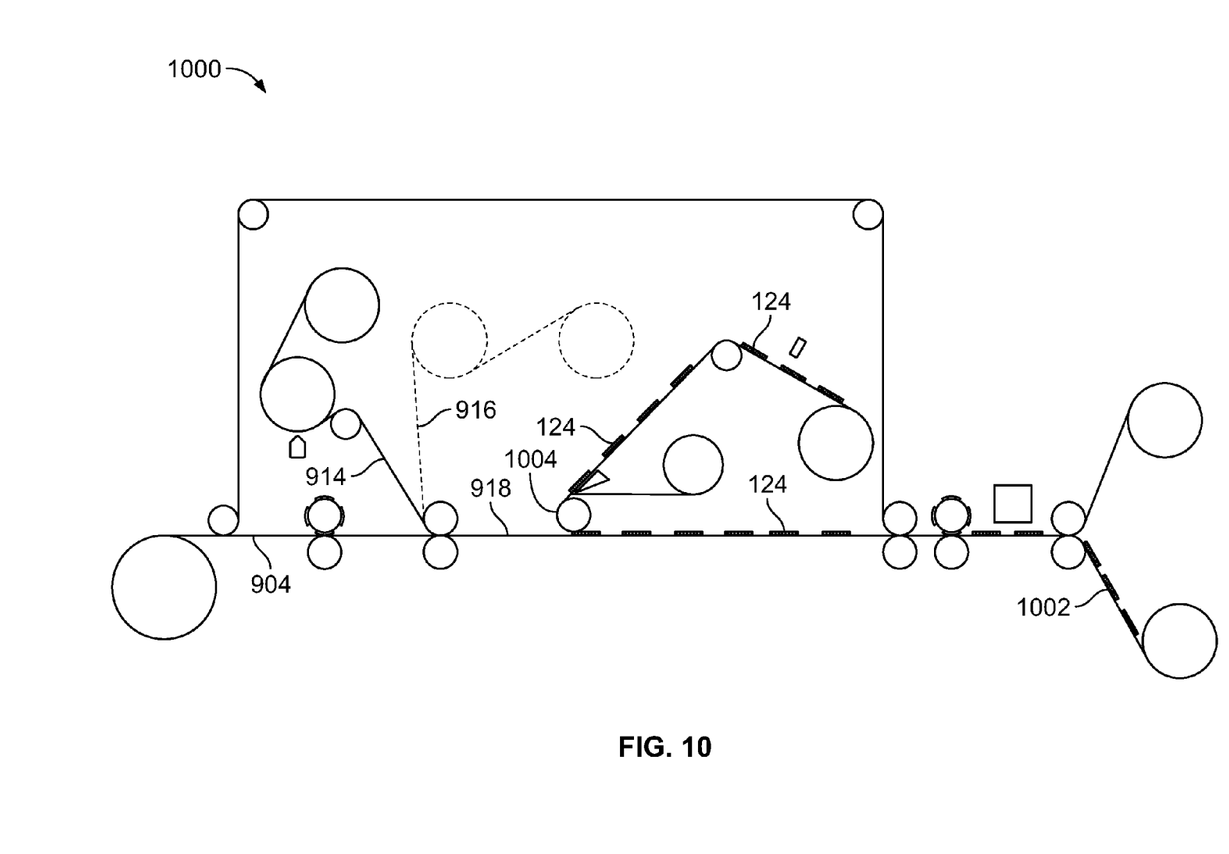
FIG. 10 is a schematic of another example apparatus to manufacture another example RFID tag standoff in accordance with the teachings of this disclosure.

FIG. 10 is a schematic of another example apparatus 1000 that may be used to manufacture another example RFID tag standoff 1002. As illustrated in FIG. 10, the apparatus 1000 produces the RFID tag standoff 1002 without the substrate layer 126 of FIG. 1. For example, the RFID tag 124 is applied to or coupled to the surface 918 of the substrate web 904 and/or the first or second adhesive web 914, 916 via a placing roll 1004.

Figure 11:
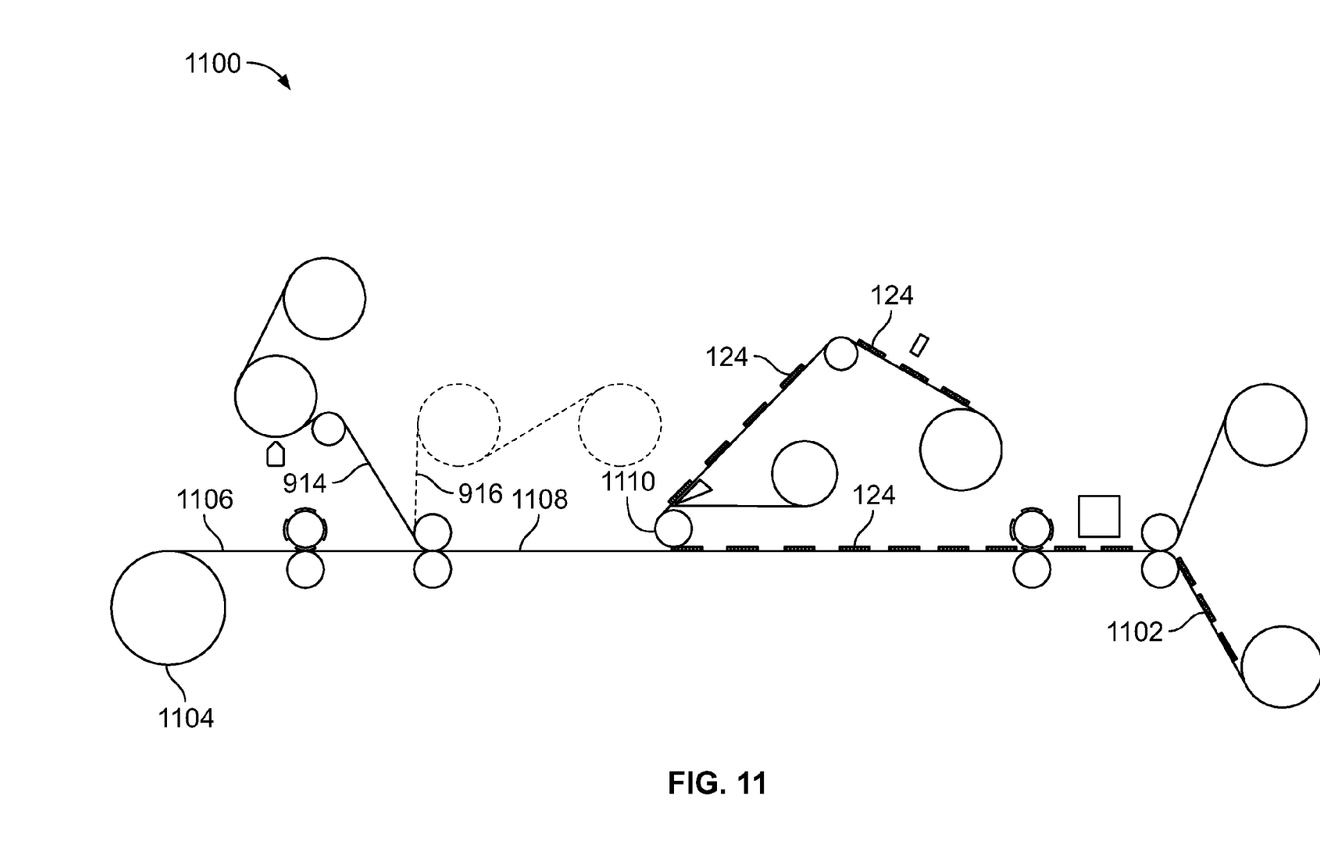
FIG. 11 is a schematic of another example apparatus to manufacture another example RFID tag standoff in accordance with the teachings of this disclosure.

FIG. 11 is a schematic of another example apparatus 1100 that may be used to manufacture another example RFID tag standoff 1102. For example, the RFID tag standoff 1102 produced by the apparatus 1100 includes a face sheet composed of synthetic material. In the illustrated example, a synthetic roll 1104 provides a synthetic web 1106 on which the first or second adhesive web 914, 916 is applied. As illustrated in FIG. 11, the RFID tag standoff 1102 is manufactured without a liner web (e.g., the liner web 906 of FIG. 9). Thus, the apparatus 1100 produces the RFID tag standoff 1102 without having a liner roll (e.g., the liner roll 908 of FIG. 9) to decouple a liner web from the synthetic web 1106 and other liner rolls (e.g., the second liner rolls 966 of FIG. 9) to recouple a liner web to the synthetic web 1106. Further, the apparatus 1100 of the illustrated example produces the RFID tag standoff without the substrate layer 126 of FIG. 1. For example, the RFID tag 124 is coupled to a surface 1108 of or embedded in the synthetic web 1106 via a placing roll 1110.

Although certain example methods and apparatus have been described herein, the scope of coverage of this patent is not limited thereto. On the contrary, this patent covers all methods, apparatus and articles of manufacture fairly falling within the scope of this disclosure.

What is claimed is:
1. An apparatus, comprising:
  a face layer including
    a tag seat,
    a first extension extending from a first edge of the tag seat,
    a second extension extending from a second edge of the tag seat, the second edge opposite the first edge,
    a third extension extending from a third edge of the tag seat, and
    a fourth extension extending from a fourth edge of the tag seat, the fourth edge opposite the third edge;
  an adhesive layer applied to at least a portion an inner surface of the face layer, the adhesive layer adapted to couple the first extension and the second extension to a surface;
  an RFID tag coupled to the tag seat, wherein the RFID tag is spaced apart from the surface when outer portions of the first extension and the second extension are coupled to the surface and inner portions of the first extension and the second extension are flexed away from the surface; and a liner coupled to the adhesive layer, wherein the liner is removable from the adhesive layer to enable the adhesive layer to couple to the surface.

2. The apparatus of claim 1, wherein the third and fourth edges of the tag seat include lines of weakness to enable the third extension and the fourth extension to bend without arching the tag seat.

3. The apparatus of claim 1, wherein the first extension, the second extension, the third extension, and the fourth extension enable the RFID tag to be substantially parallel to the surface.

4. The apparatus of claim 1, wherein at least a portion of the third extension and the fourth extension are coupled to the surface to support the tag seat.

5. The apparatus of claim 1, wherein the third extension and the fourth extension are coupled together between the surface and the tag seat to partially cover the RFID tag.

6. The apparatus of claim 5, wherein an outer portion of the third extension is coupled to an inner portion of the fourth extension and an outer portion of the fourth extension is coupled to the surface.

7. The apparatus of claim 1, further including a substrate layer that receives the RFID tag and wherein the substrate layer is coupled to the adhesive layer to position the RFID tag between the face layer and the substrate layer.

8. The apparatus of claim 7, wherein the substrate layer is coupled to the tag seat and the third and fourth extensions via the adhesive layer such that portions of the tag seat and the third and fourth extensions remain uncovered by the substrate layer.

9. The apparatus of claim 1, wherein the outer portions that are coupled to the surface are adjustable to enable a distance between the tag seat and the surface to be adjustable.

10. A method comprising:
applying an adhesive web to at least a portion of an inner surface of a face web that includes a first flexible substrate and a tag seat;
coupling an RFID tag to the inner surface of the tag seat;
cutting the face web to define the tag seat, first extensions extending from opposing first and second edges of the tag seat, and second extensions extending from opposing third and fourth edges of the tag seat;
decoupling a liner web from the inner surface of the face web before the RFID tag is coupled to the face web; and
coupling the liner web to the inner surface of the face web after the RFID tag is coupled to the face web.

11. The method of claim 10, wherein coupling the RFID tag to the inner surface of the tag seat includes:
coupling the RFID tag to an inner surface of a substrate web that includes a second flexible substrate;
trimming the substrate web to define a substrate layer; and
coupling the substrate layer to the face web, wherein portions of the tag seat and the second extensions of the face web remain uncovered by the substrate layer when the substrate layer is coupled to the face web.

12. The method of claim 10, further including applying a transfer tape or a pressure-sensitive adhesive to couple the substrate layer to the face web.

13. The method of claim 10, further including forming lines of weakness along at least a portion of the third edge and the fourth edge of the tag seat of the face web to enable the second extensions to bend along the third edge and the fourth edge.

14. A web assembly system comprising:
a face web roll to move a face web that includes a first flexible substrate;
an adhesive applicator to apply an adhesive web to at least a portion of an inner surface of the face web;
an RFID tag web roll assembly to couple an RFID tag to the inner surface of a tag seat of the face web; and
a first cutter to cut the face web to define the tag seat, first extensions extending from opposing first and second edges of the tag seat, and second extensions extending from opposing third and fourth edges of the tag seat.

15. The web assembly system of claim 14, further including:
a first liner roll to decouple a liner web from the inner surface of the face web before the RFID tag web roll assembly couples the RFID tag to the face web; and
a second liner roll to couple the liner web to the inner surface of the face web after the RFID tag web roll assembly couples the RFID tag to the face web.

16. The web assembly system of claim 14, wherein the RFID tag web roll assembly includes:
a substrate web roll to move a substrate web that includes a second flexible substrate;
an RFID tag web roll to couple the RFID tag to an inner surface of the substrate web;
a second cutter to define a substrate layer from the substrate web; and
a substrate layer roll to couple the inner surface of the substrate layer to the tag seat and the second extensions of the face web via the adhesive web, and wherein portions of the tag seat and the second extensions of the face web remain uncovered by the substrate layer when the substrate layer is coupled to the face web.

17. The web assembly system of claim 14, further including a tape roll or a pressure-sensitive adhesive applicator to couple the substrate layer to the face web.

18. The web assembly system of claim 14, further including a third cutter to form lines of weakness along at least a portion of the third edge and the fourth edge of the tag seat of the face web to enable the second extensions to bend along the third edge and the fourth edge.

* * * * *